United States Patent Office

3,376,217
Patented Apr. 2, 1968

3,376,217
METHOD FOR REMOVING THIOPHENES FROM LIGHT OIL WITH SULFURIC ACID
Charles J. De Grange, Hobart, and Steven F. Gobla, Gary, Ind., assignors to United States Steel Corporation, a corporation of Delaware
No Drawing. Filed Feb. 10, 1965, Ser. No. 431,694
4 Claims. (Cl. 208—224)

This invention relates to a method for removing thiophenes from light oil derived from coal tar distillation.

Coal tar and coke-oven light oil are products of coal distillation and, more particularly, of the carbonization of coal in by-product coke ovens. Coal tar is usually fractionated into products, including solvent naphtha. Light oil contains aromatic hydrocarbons, paraffins, thiophene, methylated thiophenes, phenols, pyridine bases and other derivatives. Light oil is usually scrubbed from coke-oven gas with an adsorbent oil. The absorbent oil is steam distilled to produce the crude light oil, usually boiling up to 160° to 200° C. This light oil is usually freed from resins, olefins, pyridine bases and other unsaturated compounds by washing with 66° Bé. sulphuric acid in large agitators. The acid is drained from the agitator, and the acidified oil is treated with an alkali to neutralize residual acid and to remove phenols. The oil, however, still contains thiophenes that distill over with the fractionation products, principally benzene, toluene and xylene. Generally, thiophene distills with the benzene, methyl thiophenes with the toluene and dimethyl thiophenes with the mixed xylenes.

Many procedures have been proposed for removing thiophenes from light oil or its fractionation products. These include catalytic hydrogenation, reaction with aluminum chloride, and the use of sulphuric acid with other materials or acid more concentrated than 66° Bé. (93.2%) acid. These procedures are costly, require excessive maintenance or result in excessive sulphonation of the fractionation products.

We have invented a novel method for removing thiophenes from aromatic oil and particularly for treating crude, unwashed light oil containing from about 5,000 to 7,000 or more parts per million (p.p.m.) of thiophene or for treating crude or refined benzene to remove thiophene therefrom. Removal can be effected to less than 1 p.p.m. thiophene or to such a relatively low concentration thereof as to render the oils usable for many purposes. Thiophene removal from benzene to low concentrations is particularly desirable, for example, where benzene is used in the manufacture of aniline or in catalytic syntheses where thiophene poisons some catalysts. Throughout the specification and claims where the term "thiophenes" is used, it includes thiophene, methyl thiophenes and dimethyl thiophenes since our method removes these products.

In accordance with our invention, crude light oil is intimately mixed with sulphuric acid and a crude, unwashed solvent-naphtha fraction obtained from distilling coal tar. The naphtha fraction usually distills over a range between about 160° and 205° C.

Our method, as stated, involves a conjoint action of sulphuric acid and solvent naphtha. We have found that the presence of the solvent naphtha can easily effect removal of thiophene to below about 10 p.p.m. Treatment under controlled temperature conditions can effect further removal of thiophene, for example, to below about 1 p.p.m. It is known that, by use of 66° Bé. sulphuric acid alone, the treated oil will have a thiophene content ranging between about 100 and 500 p.p.m. Some further reduction in thiophene content will result with use or more concentrated acid (96%–98%) or oleum. We can also use these more concentrated acids in our process. As is also known, however, their use results in greater sulphonation losses or benzene, toluene, and xylene.

A crude solvent-naphtha fraction distilling between about 160° and 205° C. contains an appreciable quantity of indene (boiling point 182° C.), usually between about 35% and 45% by weight of the fraction. We believe the indene, and possibly other constituents in the fraction, react with the sulphuric acid, forming esters that copolymerize with the thiophenes in the light oil. These copolymers are removed with the residue in the subsequent fractionation of neutralized light oil to yield principally benzene, toluene, and xylene as overhead products.

Intimate mixing of the constituents can be effected by known means, for example, in an agitator, in concurrent, rapid flow in a piping system, or in countercurrent flow in a tower. The required quantity of 66° Bé. sulphuric acid will vary between about 3% and 6% by volume of the light oil, depending on such factors as the concentration of thiophenes and other products in the light oil with which the acid reacts. The required quantity of solvent naphtha or an indene-containing coal-tar fraction will vary between about 0.05% and 2% by volume of the light oil depending largely on the content of thiophenes and indene. The thiophene content of a crude light oil containing between 5,000 and 7,000 p.p.m. thiophene can be reduced to below about 10 p.p.m. thiophene by agitation with the above-described volume of sulphuric acid and crude solvent naphtha in a temperature range between about 20° and 60° C. It is important, however, where it is desired to reduce the thiophene content of such a light oil to below 1 p.p.m. thiophene and to operate most efficiently with minimum use of acid and solvent naphtha, that the temperature be maintained between about 20° and 25° C. As the temperature is decreased below about 20° C. and increased above 25° C., the reaction efficiency decreases. To obtain a purified light oil having less than 1 p.p.m. thiophene as the temperatures depart from the preferred range, the acid and naphtha volumes must be increased to the high side of the preferred ranges. The purification can be effected in a single step or in two steps. For two-step operation, the light oil may be stirred with sulphuric acid and solvent naphtha. After separating oil and acid, the operation is repeated with fresh acid and solvent naphtha. A two-step operation may be preferable for a number of reasons, for example, where the thiophene content of the oil is high and the purified oil should be low in thiophene, where it is preferred to separate heavy acid sludge initially and to reuse the acid separated after the second step, where the first step is performed at ambient temperature and the second step at 20° to 25° C. or where the first step is performed on crude oil and the second step on a fractionated constituent thereof, with or without the above-described variation in temperatures. Intimate mixing, as reflected in the stirring time, will depend on the efficiency of agitation. In the usual large plant agitators, between about 3 and 6 hours is normally sufficient. With more efficient mixing in piping systems and contact towers, only a few minutes may be sufficient.

A complete understanding of the invention may be obtained from the following typical examples.

In Examples 1–4, the crude, unwashed coke-oven light oil had an average distillation range between 78° C. and 200° C. and contained an average of about 7,000 p.p.m. thiophene. After removing moisture, the crude, unwashed solvent naphtha had an average distillation range between 163° and 204° C. and contained about 40% indene, by weight. The temperature of the charged light oil and acid was about 6° C. In Examples 5–10, the crude, unwashed coke-oven light oil had an average distillation range between 79° C. and 150° C. and contained an average of about 5,100 p.p.m. thiophene. After removing moisture, the crude, unwashed solvent naphtha had an average distillation range between 167° and 203° C. and contained about 39% indene, by weight. In the examples, the oil samples were fractionated in a forty-plate Oldershaw column to 1° C. benzene, 1° C. toluene and 10° C. xylene, as required. The thiophene in the 1° C. benzene was determined by the Du Pont Isatin method (No. 180–85). The methyl thiophenes in the 1° C. toluene and the dimethyl thiophenes in the 10° C. xylene were determined by gas chromatography. As a check, the total sulfur content was determined by the Du Pont combustion method (BW–212).

Example 1

About 10,000 gallons of crude coke-oven light oil were charged to an agitator and agitated for 3 hours. During the first hour, 350 gallons (3.5% by volume of oil) 66° Bé. sulphuric acid were added. Thereafter, 10 gallons (0.1% by volume of oil) of crude solvent naphtha were added. The mixture attained and substantially maintained a temperature of about 42° C. after the 3-hour agitation period, the acid sludge was drained from the separated oil-acid layers and an oil sample was taken. The sample contained 6.8 p.p.m. thiophene. After washing with water and lime, the neutralized light oil was in condition for fractionation. In this example, acid used=350 gallons (3.5% by volume of oil); solvent=10 gallons (0.1% by volume of oil); agitation time=3 hours.

Example 2

About 10,000 gallons of crude coke-oven light oil were charged to an agitator and agitated for 3.75 hours. During the first hour, 75 gallons (0.75%) 66° Bé. acid were added. Thereafter, 5 gallons (0.05%) crude solvent naphtha were added. During the second hour, 250 gallons (2.5%) 66° Bé. acid were added. The mixture attained and substantially maintained a temperature of about 46° C. After separating acid and oil, the oil sample contained 4.4 p.p.m. thiophene. In this example, acid=325 gallons (3.25%); solvent=5 gallons (0.05%); agitation time=3.75 hours.

Example 3

About 10,000 gallons of crude coke-oven light oil were charged to an agitator and agitated for 4 hours. During the first 1.5 hours, 350 gallons (3.5%) 66° Bé. acid and 5 gallons (0.05%) crude solvent naphtha were added. The mixture attained and maintained a temperature of about 45° C. After draining the separated acid layer, there were added to the oil 150 gallons (1.5%) 66° Bé. acid and 80 gallons (0.8%) of crude solvent naphtha. The mixture was agitated for about 3 hours. Average temperature of the mixture was about 40° C. After separating acid and oil, the oil sample contained 2.5 p.p.m. thiophene. In this example, acid=500 gallons (5.0%); solvent=85 gallons (0.85%); agitation time=7 hours.

Example 4

About 10,000 gallons of crude coke-oven light oil and 50 gallons (0.5%) 66° Bé. acid were charged to an agitator and agitated for about 4.25 hours. Fifteen minutes after starting, 300 gallons (3.0%) 66° Bé. acid were added. About 3.25 hours after starting, there were added 100 gallons (1.0%) 66° Bé. acid and 50 gallons (0.5%) crude solvent naphtha. The mixture attained and maintained a temperature of about 46° C. After draining the acid and sludge, there were added to the oil 150 gallons (1.5%) 66° Bé. acid and 100 gallons (1.0%) of crude solvent naphtha. The mixture was agitated for about 1.5 hours. The average temperature of the mixture was about 45° C. After separating acid and oil, an oil sample contained 0.8 p.p.m. thiophene. In this example, acid=600 gallons (6.0%); solvent=150 gallons (1.5%); agitation time=5.75 hours.

Examples 5–10

To a temperature-controlled agitator there were added 500 cc. of crude coke-oven light oil, 20 cc. (4%) 66° Bé. sulphuric acid and 5 cc. (1%) crude solvent naphtha. The mixture was agitated for 2 hours and the temperature was maintained at 60° C. After draining the acid, an oil sample contained 30.4 p.p.m. thiophene. To the oil there were added 5 cc. (1%) 66° Bé. acid and 2.5 cc. (0.5%) crude solvent naphtha. The mixture was agitated for 0.5 hour and the temperature was maintained at 60° C. After draining the acid, an oil sample contained 19.4 p.p.m. thiophene. In this example 5, acid=25 cc. (5% by volume of oil); solvent=7.5 cc. (1.5% by volume of oil); agitation time=2.5 hours. Example 5 was repeated as Examples 6–10, all quantities and agitation time remaining the same. The only change in Examples 6–10 was the temperature at which the mixture was maintained during agitation. The temperatures and results obtained are tabulated in Table I.

TABLE I

| Example Number | Temperature During Agitation, ° C. | Thiophene, p.p.m. | |
|---|---|---|---|
| | | Intermediate Sample | Final Sample |
| 5 | 60 | 30.4 | 19.4 |
| 6 | 50 | 21.0 | 11.0 |
| 7 | 40 | 16.0 | 5.4 |
| 8 | 30 | 9.0 | 1.6 |
| 9 | 20 | 1.9 | 0.6 |
| 10 | 15 | 2.5 | 1.0 |

Additional portions were taken of the crude coke-oven light oil and of the final sample of oil treated in Example 9 at 20° C. The 1° C. toluene fraction from the sample of crude light oil contained about 600 p.p.m. of 2-methyl thiophene and about 1,300 p.p.m. of 3-methyl thiophene. The 1° C. toluene fraction from the final sample contained about 57 p.p.m. of 2-methyl thiophene and about 182 p.p.m. of 3-methyl thiophene. The 1° C. toluene fraction from the sample of crude light oil contained about 623 p.p.m. of total sulfur. The 1° C. toluene fraction from the final sample contained about 60 p.p.m. of total sulfur. The 10° C. xylene fraction from the crude light oil contained about 200 p.p.m. each of 2,3-dimethyl thiophene, 2,4-dimethyl thiophene and 2,5-dimethyl thiophene. The 10° C. xylene fraction from the final sample contained about 40 p.p.m. each of said dimethyl thiophenes. The 10° C. xylene fraction from the sample of crude light oil contained about 171 p.p.m. of total sulfur. The 10° C. xylene fraction from the final sample contained about 34 p.p.m. of total sulfur.

The foregoing examples show the highly advantageous results obtained by the action of sulphuric acid and a crude solvent naphtha in reducing the thiophenes in crude light oil. A mixing or agitation temperature between about 20° and 25° C. is preferred since above and below this range, the eraction efficiency decreases. The benefits of the invention may be obtained, however, when using large, existing agitators, not capable of close temperature control, by adding sufficient acid and solvent naphtha, i.e., amounts, which are usually on the high side of the preferred ranges for these constituents. The above examples illustrate preferred methods of operation, but other conditions may be used without departing from the spirit of the invention.

While 66° Bé. sulphuric acid produces satisfactory resutls, acids of higher strength and oleum may be used, with due regard for increased sulphonation losses of benzene, toluene, and xylene. In a two-step operation, the sulphuric acid drained after the first step is heavy with sludge and is usually discarded. The acid drained after the second step usually has relatively little sludge and may be reused. The solvent naphtha, boiling over a range between about 160° and 205° C., is a commercial product. An indene-containing coal-tar fraction may have a closer boiling range. Hence, with a greater concentration of indene than about 35%–45% by weight of the fraction, the preferred results may be obtained with such a fraction when using less than between about 0.05% and 2.0% by volume of the light oil. Our method may be used to treat the individual fractionated products where the light oil has not been treated by our method or has been treated only with sulphuric acid.

The invention is characterized by several distinct advantages. In the first place, the reactions are simple ones and the reagents are relatively inexpensive. In the second place, existing plant agitators may be used. Finally, our method is successful in reducing the thiophenes in crude, unwashed light oil, a more-purified oil or a fractionated product thereof. Likewise, the solvent-naphtha fraction may be a crude, unwashed fraction or one that is more purified.

Although we have disclosed herein the preferred practice of our invention, we intend to cover as well any change or modification therein which may be made without departing from the spirit and scope of the invention.

We claim:

1. A method of substantially removing thiophenes from light oil produced in coal distillation and having about 5000–7000 parts per million of thiophene, which method comprises the steps of:
    (a) intimately mixing said light oil with between about 3.25 and 4.5% by volume of said light oil of concentrated sulphuric acid and with between about 0.1 and 1.0% by volume of said light oil of a crude solvent naphtha fraction having a boiling range between about 160° C. and 205° C.,
        (1) said fraction containing indene in the range between about 0.035% and .450% by weight of said light oil,
    (b) continually mixing said light oil, said sulphuric acid and said fraction for a period between about 1.5 and 4.25 hours at a temperature in the range of about 15° C. and 60° C.,
    (c) allowing said mixture to separate into an acid layer and an oil layer, and
    (d) separating said acid layer from said oil layer and thereby recovering light oil having a thiophene content of less than about 30.4 p.p.m. of said light oil.

2. The method recited in claim 1 and having the additional step of:
    (a) intimately mixing said recovered light oil with between about 1.0 and 1.5% by volume of concentrated sulphuric acid and with between about 0.5 and 1.0% by volume of said light oil of said crude solvent naphtha fraction,
    (b) continually mixing said light oil, said sulphuric acid and said fraction for a period of about 0.5–3.0 hours at a temperature in the range of about 15° C. and 60° C.,
    (c) allowing said mixture to separate into an acid layer and an oil layer, and
    (d) separating said acid layer from said oil layer and thereby recovering light oil having a thiophene content of less than about 19.4 p.p.m. of said light oil.

3. A method of substantially removing thiophenes from light oil prdouced in coal distillation and having about 5000–7000 parts per million of thiophene which method comprises the steps of:
    (a) intimately mixing said light oil with between about 3.25 and 4.5% by volume of said light oil of concentrated sulphuric acid and with between about 0.1 and 1.0% by volume of said light oil of a crude solvent naphtha fraction having a boiling range between about 160° C. and 205° C.,
        (1) said fraction containing indene in the range between about 0.035% and .450% by weight of said light oil,
    (b) continually mixing said light oil, said sulphuric acid and said fraction for a period between about 1.5 and 4.25 hours at a temperature in the range of about 15° C. and 46° C.,
    (c) allowing said mixture to separate into an acid layer and an oil layer, and
    (d) separating said acid layer from said oil layer and thereby recovering light oil having a thiophene content of less than about 16.0 p.p.m. of said light oil.

4. The method recited in claim 3 and having the additional step of:
    (a) intimately mixing said recovered light oil with between about 1.0 and 1.5% by volume of concentrated sulphuric acid and with between about 0.5 and 1.0% by volume of said light oil of said crude solvent naphtha fraction,
    (b) continually mixing said light oil, said sulphuric acid and said fraction for a period of about 0.5–3.0 hours at a temperature in the range of about 15° C. and 46° C.,
    (c) allowing said mixture to separate into an acid layer and an oil layer, and
    (d) separating said acid layer from said oil layer and thereby recovering light oil having a thiophene content of less than about 5.4 p.p.m. of said light oil.

References Cited

UNITED STATES PATENTS

| 2,376,644 | 5/1945 | Wells et al. | 208—222 |
| 3,265,754 | 8/1966 | Delassus et al. | 208—224 |

OTHER REFERENCES

"Benzoles Production and Uses," G. Claxton, 1961, The National Benzole and Allied Products Association, London, S.W. 1, pp. 407–416, especially pp. 412–414.

Desha, "Organic Chemistry," 2nd edition, 1952, McGraw-Hill Book Co., New York, N.Y., pp. 109–114, especially page 111.

SAMUEL P. JONES, *Primary Examiner.*

DELBERT E. GANTZ, *Examiner.*

UNITED STATES PATENT OFFICE
CERTIFICATE OF CORRECTION

Patent No. 3,376,217                                         April 2, 1968

Charles J. De Grange et al.

It is certified that error appears in the above identified patent and that said Letters Patent are hereby corrected as shown below:

Column 1, line 19, "adsorbent" should read -- absorbent --; line 70, "or" should read -- of --. Column 2, line 2, "or" should read -- of --. Column 3, line 20, "after" should read -- After --. Column 4, line 53, "eraction" should read -- reaction --.

Signed and sealed this 12th day of August 1969.

(SEAL)
Attest:

Edward M. Fletcher, Jr.                               WILLIAM E. SCHUYLER, JR.
Attesting Officer                                          Commissioner of Patents